W. A. MORRISON.
Evaporating-Pan.
No. 198,900. Patented Jan. 1, 1878.
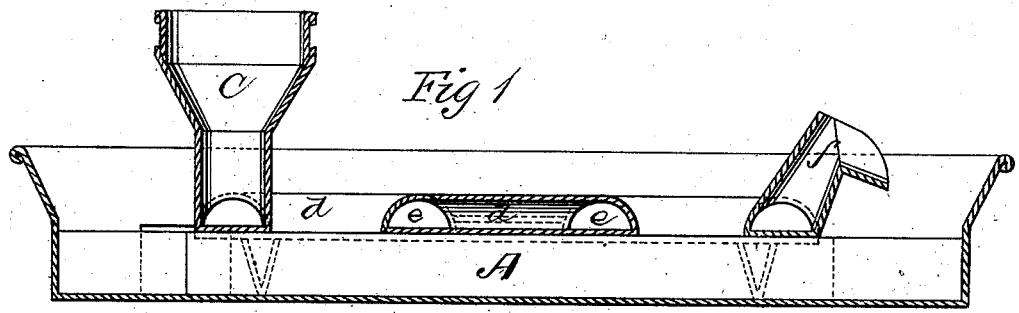
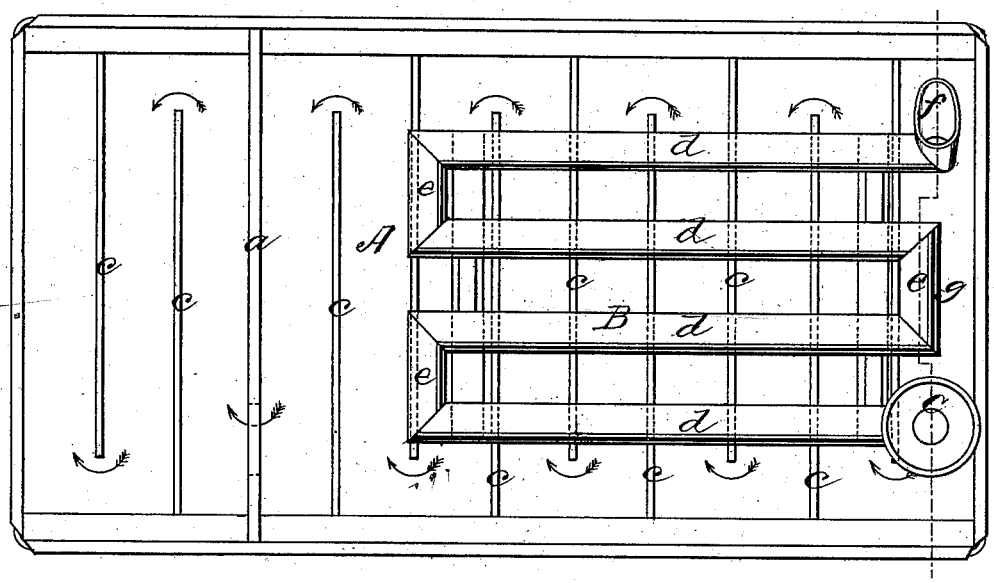
WITNESSES
Villette Anderson
F. J. Masi
INVENTOR
Wm A. Morrison,
by E. W. Anderson,
ATTORNEY

UNITED STATES PATENT OFFICE.

WILLIAM A. MORRISON, OF FRELIGHSBURG, ASSIGNOR TO ELIJAH EDMUND SPENCER, OF THE PARISH OF ST. ARMAND EAST, PROVINCE OF QUEBEC, CANADA.

IMPROVEMENT IN EVAPORATING-PANS.

Specification forming part of Letters Patent No. 198,900, dated January 1, 1878; application filed October 13, 1877.

*To all whom it may concern:*

Be it known that I, WILLIAM A. MORRISON, of Frelighsburg, in the Province of Quebec and Dominion of Canada, have invented a new and valuable Improvement in Heater and Sugar-Evaporator Combined; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a cross-sectional view of my invention, and Fig. 2 is a plan view of the same.

This invention has relation to improvements in devices for boiling or evaporating maple-sap, cane-juice, sorghum, and other saccharine matter.

The object of my invention is to utilize the usually wasted steam and heat arising from the boiling sap in the evaporating-pan, to render hot or cause to boil the fresh or cold supply of the same before it reaches the said pan, so that the entire superficies of the bottom of the pan may be utilized in causing the sap to be reduced to sirup.

The nature of the invention consists in combining, with an evaporating-pan, a pipe or system of communicating pipes adapted to be placed in the pan above the sap, which, being raised to the boiling-point, will cause the sap in the pipes to be delivered to the pan in a heated or boiling condition, thereby greatly accelerating the formation of sirup, as will be hereinafter more fully explained.

In the accompanying drawings, the letter A indicates an oblong rectangular metallic pan, having near one end a transverse partition, *a*, provided with a gate or sap-valve. Both of the compartments thus formed are provided with spaced partitions *c*, forming labyrinthine channels, which delay the sap in its passage from the front end of the pan to the rear end thereof, and cause it to be longer subjected to the effects of the heat of the furnace. This evaporating-pan may be made of any desired size, and of any of the usual materials, or combinations thereof.

B represents the subsidiary heater, composed of a number of communicating pipes, *d*, arranged side by side, and provided with supporting-legs, if I so elect. These pipes are preferably flat upon their lower faces, in order that as extended a heating-surface as possible may be had—that is, they are preferably semi-cylindrical in cross-section; but they may be round, oval, or square, if I so elect. The connecting-pipes *e* are at alternate ends of the pipes *d*, and are so arranged that the induct and educt ends of the subsidiary heater which they form are both at the front end of the pan A, when it is placed in the said pan with its flat side resting upon the ribs or partitions *c* of the larger compartment. The induct end of the heater B is provided with a funnel, C, extending up above the level of the top of the pan, and the educt end with a discharge-spout, *f*, the upper edge of which is raised up above the level of the top of the said heater, so that when the sap is running the pipes *d e* may be always full. The spout *f* is preferably at an inclination, so that the sap may be discharged from it free from the heater, and in a thin stream.

The operation of the apparatus is as follows: The pan A is first filled with sap nearly up to the level of the tops or partitions *c*, and a fire built in the furnace under the same. The sap being raised to the boiling-point, the heater B is placed in position on the said partitions, with its funnel and spout at the front end of the said pan, and the liquid run from the sap-vessel directly into the funnel C, its quantity being regulated by a stop-cock, faucet, or other equivalent device in the pipe leading from the sap-reservoir into the said funnel. As the sap passes through the branches of the heater B it is subjected to a very strong current of steam and radiated heat arising from the boiling sap in the pan, so that when it reaches the spout *f* it is raised nearly to a boiling-point. Sometimes it is actually boiling, and falls into the front channel *g* of the pan in this condition.

By this means the sap is made to boil at the moment it falls into the channel of the pan next the front end, whereas by the employment of the pan alone it would not reach that temperature until it had passed through several of the said channels and had reached nearly to the middle portion of the said pan.

It is evident that the heater causes a great saving in time and fuel, and greatly facilitates the formation of sirup.

When the sap has passed through the channels in its serpentine course from the front to the rear end of the pan A, it has been boiled down to a sirup, and is drawn off in a constant stream by means of a spout or faucet.

I do not confine myself to the precise construction of the subsidiary heater hereinbefore described, as there are many variations thereof which I might employ discharging the same functions; nor do I confine myself to placing the funnel and discharge-spout in the positions illustrated, as under varying circumstances these arrangements might be inconvenient and impossible.

What I claim as new, and desire to secure by Letters Patent, is—

The subsidiary heater consisting of the spaced pipes $d$ and the connecting-pipes $e$, flat upon their under sides, and provided with the funnel C and discharge-spout $f$, extending above the level of the top of said pipes, substantially as set forth.

In testimony that I claim the above I have hereunto subscribed my name in the presence of two witnesses.

WILLIAM A. MORRISON.

Witnesses:
 HIRAM MARTIN,
 GEO. W. WELLS.